US009590300B2

(12) United States Patent
Artemenko et al.

(10) Patent No.: US 9,590,300 B2
(45) Date of Patent: Mar. 7, 2017

(54) ELECTRONICALLY BEAM-STEERABLE ANTENNA DEVICE (71) Applicant: RADIO GIGABIT, LLC, Moscow (RU)

(72) Inventors: Aleksey Andreevich Artemenko, Nizhny Novgorod (RU); Roman Olegovich Maslennikov, Nizhny Novgorod (RU)

(73) Assignee: Radio Gigabit, LLC, Moscow (RU)

( * ) Notice: Subject to any disclaimer, the term of this patent is extended or adjusted under 35 U.S.C. 154(b) by 397 days.

(21) Appl. No.: 14/088,875

(22) Filed: Nov. 25, 2013

(65) Prior Publication Data
US 2014/0077995 A1 Mar. 20, 2014

Related U.S. Application Data (63) Continuation-in-part of application No. PCT/RU2011/000371, filed on May 23, 2011.

(51) Int. Cl.
*H04B 7/00* (2006.01)
*H01Q 3/24* (2006.01)
(Continued)

(52) U.S. Cl.
CPC .............. *H01Q 3/24* (2013.01); *H01Q 19/062* (2013.01); *H01Q 21/065* (2013.01); *H04B 7/00* (2013.01)

(58) Field of Classification Search
CPC .......... H04B 7/00; H01Q 3/24; H01Q 19/062; H01Q 21/065
(Continued)

(56) References Cited

U.S. PATENT DOCUMENTS 4,574,287 A   3/1986   Waters et al.
5,185,613 A   2/1993   Whatmore et al.
(Continued)

FOREIGN PATENT DOCUMENTS

CN    102842769 A  * 12/2012  ............... H01Q 1/20
EP    0427201 A2    5/1991
(Continued)

OTHER PUBLICATIONS

Dou, W. B. and Z. L. Sun, "Ray tracing on extended hemispherical and elliptical silicon dielectric lenses,"International Journal of Infrared and Millimeter Waves, vol. 16, pp. 1993-2002, No. 1 L, 1995.
(Continued)

*Primary Examiner* — Harry Liu
(74) *Attorney, Agent, or Firm* — Pepper Hamilton LLP (57) ABSTRACT An electronically beam-steerable antenna device comprises a dielectric lens having at least one flat surface, a high frequency dielectric board, a plurality of at least one primary antenna element with at least one transmission line formed on the high frequency dielectric board, and a switching network electrically connected to the said plurality of at least one primary antenna element and at least one transmission line and adapted to apply electric power to the at least one primary antenna element. The switching network is a semiconductor integrated circuit mounted in or on the high frequency dielectric board, and the high frequency dielectric board with the plurality of at least one antenna element and at least one transmission line formed thereon is adjacent to the flat surface of the dielectric lens.

The electronically beam steerable antenna device according to the present invention allows for electronic beam steering in a continuous angle sector while increasing radiation efficiency. The antenna device according to the present
(Continued)

invention may be used for providing high data rate point-to-point millimeter-wave communications in radio relay station applications.

18 Claims, 5 Drawing Sheets

(51) Int. Cl.
*H01Q 19/06* (2006.01)
*H01Q 21/06* (2006.01)

(58) Field of Classification Search
USPC .......................................................... 342/367
See application file for complete search history.

(56) References Cited

U.S. PATENT DOCUMENTS

| | | | |
|---|---|---|---|
| 5,481,268 | A | 1/1996 | Higgins |
| 5,486,832 | A | 1/1996 | Hulderman |
| 5,706,017 | A | 1/1998 | Buttgenbach |
| 5,966,103 | A | 10/1999 | Pons et al. |
| 6,034,641 | A | 3/2000 | Kudoh et al. |
| 6,317,096 | B1 | 11/2001 | Daginnus et al. |
| 6,587,699 | B2 | 7/2003 | Olsen et al. |
| 6,590,544 | B1 | 7/2003 | Filipovic |
| 6,859,187 | B2 | 2/2005 | Ohlsson |
| 7,642,961 | B1 | 1/2010 | Rausch |
| 7,667,665 | B1 | 2/2010 | Colburn et al. |
| 7,683,844 | B2 | 3/2010 | Alamouti et al. |
| 7,688,263 | B1 | 3/2010 | Oxlet |
| 7,834,803 | B2 | 11/2010 | Weinstein |
| 7,844,217 | B2 | 11/2010 | Charash |
| 2002/0164945 | A1 | 11/2002 | Olsen et al. |
| 2003/0022694 | A1 | 1/2003 | Olsen et al. |
| 2004/0072579 | A1 | 4/2004 | Hottinen |
| 2004/0174299 | A1 | 9/2004 | Casas et al. |
| 2005/0020311 | A1 | 1/2005 | Goldberg et al. |
| 2006/0114158 | A1 | 6/2006 | Chiang et al. |
| 2008/0023216 | A1* | 1/2008 | Hang ............... C03C 3/068 174/250 |
| 2008/0153549 | A1 | 6/2008 | Korevaar et al. |
| 2008/0284655 | A1* | 11/2008 | Alamouti .......... H01Q 1/38 343/700 MS |
| 2009/0007185 | A1 | 1/2009 | Nix et al. |
| 2010/0052987 | A1 | 3/2010 | Weinstein |
| 2011/0095953 | A1 | 4/2011 | Lier |
| 2011/0182174 | A1* | 7/2011 | Pi ..................... H04W 88/10 370/229 |
| 2013/0285848 | A1 | 10/2013 | Grau Besoli et al. |
| 2014/0227966 | A1 | 8/2014 | Artemenko et al. |
| 2015/0116154 | A1 | 4/2015 | Artemenko et al. |
| 2016/0013550 | A1 | 1/2016 | Artemenko et al. |

FOREIGN PATENT DOCUMENTS

| | | |
|---|---|---|
| FR | 2581798 A1 | 11/1986 |
| FR | 2705169 A1 | 11/1994 |
| GB | 2459131 A | 10/2009 |
| JP | 201210245 A | 1/2012 |
| RU | 2177662 C1 | 12/2001 |
| RU | 2236073 C2 | 9/2004 |
| RU | 2291527 C2 | 1/2007 |
| RU | 68191 U1 | 11/2007 |
| RU | 2349007 C1 | 3/2009 |
| RU | 2474045 C2 | 1/2013 |
| RU | 2476015 C2 | 2/2013 |
| RU | 2494506 C1 | 9/2013 |
| WO | 2004051803 | 6/2004 |
| WO | 2004077607 A2 | 9/2004 |
| WO | 2007136289 A1 | 11/2007 |
| WO | 2012161612 A1 | 11/2012 |
| WO | 2013058673 A1 | 4/2013 |
| WO | 2014011087 | 1/2014 |

OTHER PUBLICATIONS

Filipovic, D. F. et al., "Off-Axis Properties of Silicon and Quartz Dielectric Lens Antennas," IEEE Trans. on Antennas and Propagation, vol. 45, No. 5, pp. 760-766, May 1997.
International Search Report and Written Opinion issued in PCT/RU2011/000371 dated Feb. 24, 2012, 9 pages.
International Preliminary Report on Patentability Issued in PCT/RU2011/000371 dated Sep. 18, 2013, 25 pages.
Filipovic D F et al: "Doubie-slot Antennas on Extended Hemi-spherical and Elliptical Silicon Dielectric Lenses", IEEE Transactions on Microwave Theoiy and Techniques, IEEE Service Center, Piscataway, NJ, US, vol. 41, No. 10, Oct. 1, 1993 (Oct. 1, 1993).pp. 1738-1749, ISSN: 0018-9480, DOI: 10.1109/22.247919.
Alexey Artemenko et al: "Millimeter-Wave Electronically Steerable integrated Lens Antennas for WLAN/WPAN Applications", IEEE Transactions on Antennas and Propagation, IEEE Service Center, Piscataway, NJ, US, vol. 61, No. 4, Apr. 1, 2013 (Apr. 1, 2013), pp. 1665-1671, XP011499218, ISSN: 0018-926X, DOI: 10.1109/Tap. 2012.2232266.
Fernandes C A et al: "Shaped Coverage of Elongated Cells at Millimetre Waves Using a Dielectric Lens Antennas", Proceedings of the 25th European Microwave Conference 1995. Bologna, Sep. 4-7, 1995; [Proceedings of the European Microwave Conference], Swanley, Nexus Media, GB, vol. CONF. 25, Sep. 4, 1995 (Sep. 4, 1995), pp. 66-70, XP000740148, ISBN: 978-1-899919-15-4.

\* cited by examiner

ELECTRONICALLY BEAM-STEERABLE ANTENNA DEVICE

CROSS-REFERENCE TO RELATED APPLICATIONS

This application is a continuation-in-part of International application No. PCT/RU2011/000371, filed May 23, 2011, the content of which is incorporated herein by reference in its entirety.

FIELD OF INVENTION

The present invention generally relates to the field of radio communication technology and, more particularly, to electronically beam-steerable antenna devices. The present invention may be used for providing high data rate point-to-point millimeter-wave communications in radio relay station applications.

RELATED ART

Radio relay stations provide a high data rate point-to-point millimeter-wave communication at distances of about several kilometers in line-of-sight conditions. At the present time, radio relay stations use various radio frequency ranges with a carrier frequency in the range of 10 to 100 GHz. The increase of a carrier frequency is associated with constantly growing demands for higher communication system throughput. The communication system throughput can be increased using a wider frequency bandwidth so as to transmit a signal at a higher carrier frequency.

However, increase of a carrier frequency results in greater signal propagation losses. Aperture antennas having a size significantly larger than an operating wavelength and, consequently, a high directivity can be used to compensate such propagation losses. Aperture antennas include various reflector antennas, horn antennas, and lens antennas. These antennas comprise a primary antenna element emitting a signal and a secondary device having a large size and creating a highly directive radiation pattern. Various reflective mirror systems, dielectric lenses as well as combinations of mirrors and lenses can be used as such secondary device.

The use of antennas with highly directive radiation pattern is associated with problems related to adjustment and a possibility of communication failure even at slight orientation changes of a radio relay station. Aperture beam scanning antennas can be used to provide quick automatic adjustment of the beam direction in a small angle range which is equal to several radiation pattern beamwidths without employing specially instructed personnel.

Electronically beam steerable mirror antenna devices are known in the prior art. Two-mirror Cassegrain antennas are a widely used type of mirror antenna devices which can provide electronic beam steering.

For example, U.S. Pat. No. 7,834,803 discloses a Cassegrain scanning antenna configuration comprising a Cassegrain antenna and switchable horn antennas serving as primary antenna elements. In particular, such configuration provides electronic beam steering in various radar applications.

However, the use of horn antennas as primary antenna elements involves high costs. In addition, horn antennas have a large size and cannot be configured so as to provide beam overlapping at an acceptable level, e.g. the level corresponding to a half power beamwidth, while all other parameters are practically efficient. Thus, the configuration disclosed in U.S. Pat. No. 7,834,803 does not provide electronic beam steering in continuous angle sector while maintaining a stable signal transmission in a radio relay station.

Another type of an antenna device which provides electronic beam steering is a lens antenna. International application WO 2004051803 discloses a lens antenna with offset primary antenna elements. The beam scanning in this antenna is carried out using an array of switched primary antenna elements, each primary antenna element being located at a different distance from the focus perpendicularly to a lens axis. Similar antenna device having a plurality of transmitting and a plurality of receiving antenna elements and a lens is disclosed in U.S. Pat. No. 6,034,641. In these antenna devices, the antenna elements are positioned separately from a lens. Thus, these antennas are not suitable for employing planar technologies for manufacturing primary antenna elements and providing beam scanning in a continuous manner with respect to an angle. Another disadvantage of these antennas is a large axial dimension.

U.S. Pat. No. 7,688,263 and U.S. Pat. No. 7,667,665 disclose electronically beam steerable Luneberg lenses having a spherical shape. These lenses are made of a heterogeneous dielectric and have a refractive index which depends on a radius. However, in order to provide beam scanning in these antennas, primary antenna elements are disposed on an outer spherical surface of a lens that makes it impossible to use a cheap planar technology suitable for a mass production.

Known are integrated lens antennas (see for example, W. B. Dou and Z. L. Sun, "Ray tracing on extended hemispherical and elliptical silicon dielectric lenses," International Journal of Infrared and Millimeter Waves, Vol. 16, pp. 1993-2002, No. 1L, 1995 or D. F. Filipovic, G. P. Gauthier, S. Raman, and G. M. Rebeiz, "Off-Axis Properties of Silicon and Quartz Dielectric Lens Antennas," IEEE Trans. on Antennas and Propagation, vol. 45, No. 5, pp. 760-766, May 1997) allowing for solving the aforementioned problems of other electronically beam steerable antennas, particularly eliminating high costs due to difficulties of implementing planar technologies suitable for a mass production. In integrated lens antennas, switchable planar antenna elements are directly integrated on a flat lens surface.

U.S. Pat. No. 5,185,613 discloses a hybrid structure comprising a lens and an antenna array formed on a surface of the lens. The antenna elements receive the radiation focusing by the lens simultaneously from different directions. The disclosed in U.S. Pat. No. 5,185,613 antenna can operate in receive mode that is actual for imaging and radar applications but cannot operate in transmit mode that is required for communication transceivers.

Figure 1:
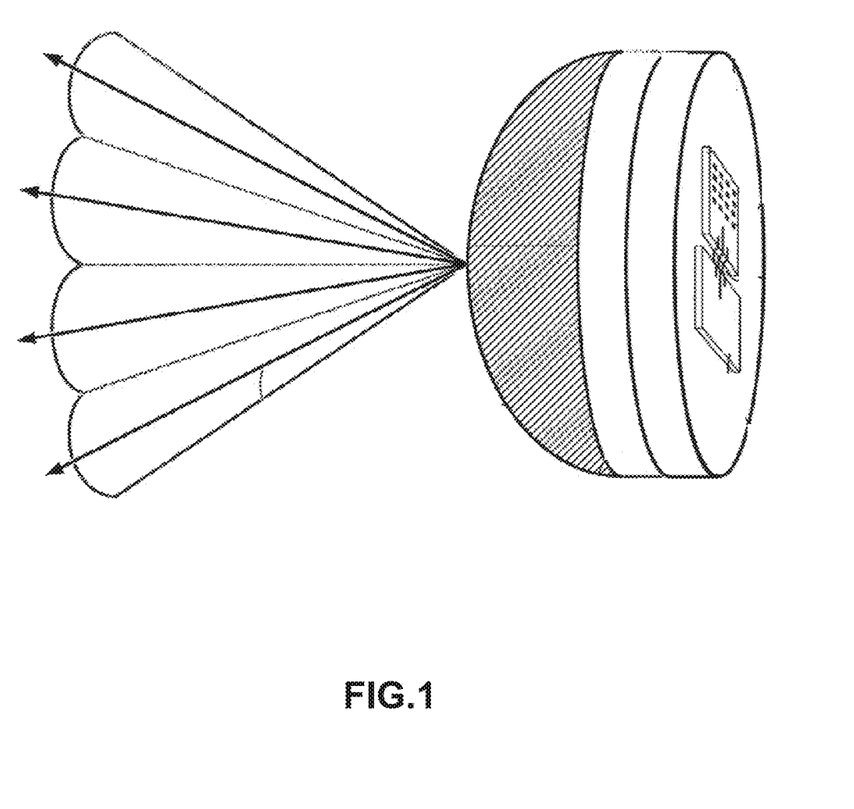
FIG. 1 illustrates a prior art electronically beam steerable antenna device.

U.S. Pat. No. 7,683,844 discloses an integrated lens antenna which can be considered as the closest prior art for the present invention. The electronically beam steerable antenna device disclosed in this patent comprises a plurality of primary antenna elements and transmission lines, a switching network adapted to apply electric power to at least one primary antenna element, wherein the plurality of primary antenna elements, transmission lines and the switching network are formed on a semiconductor die (see FIG. 1). A transceiver and the plurality of primary antenna elements are electrically connected by means of wire bond connections and are integrated on a flat surface of a hemispherical dielectric lens having a cylindrical extension. This antenna device may be used in millimeter-wave receivers, transmitters and transceivers allowing for switching between receiving and transmitting modes.

However, a disadvantage of the above antenna device is low antenna radiation efficiency (less than 15%) and high signal losses associated with the fact that the plurality of primary antenna elements is formed on a semiconductor die.

Another drawback of the antenna disclosed in the prior art is a limited group of materials which can be used for a lens. This is due to the known requirement in the integrated lens antennas to have close dielectric permittivity values of the lens and an array substrate which in the prior art is a bulk of semiconductor. Most of the state-of-the-art semiconductor technologies have a bulk with dielectric permittivity of greater than 10 (for example, GaAs, CMOS, and SiGe). A lens antenna made of the material with dielectric permittivity greater than 10 (for instance, high resistive silicon) exhibits a large reflections of the radiation at the lens-to-air boundary that decreases the antenna performance.

On more drawback of the antenna disclosed in the prior art is that there is no possibility to connect the antenna array input to the waveguide interface commonly used in the modern radio relay communication systems.

Additionally practical realization of the antenna disclosed in the prior art can be very expensive since it requires a large chip area to implement the antenna array providing desirable scanning angle range. It is known from the prior art that the angle deviation from the given antenna element is determined by the lens dielectric permittivity and x/R ratio (where x is an antenna element displacement from the lens axis and R is a lens radius). For the practical cases x can be of the order of several millimeters or even centimeters that is not always acceptable for on-chip realization.

Also disclosed in US patent application 2009/0007185 is a polarization diversity principle for receiving and transmitting signals allowing improving communication system performance. However, the disclosed principle cannot be implemented in millimeter-wave point-to-point communication systems since there is no possibility to realize a beamforming scheme using multi-element adaptive antenna arrays. Thus, an integrated lens antenna device providing polarization diversity for each beam formed by the switching circuit is also desirable.

To sum up, the major drawbacks of the prior art antenna devices are low efficiency of antenna performance and high power dissipation, time consuming and human power consuming technology of production.

Accordingly, there is a necessity to provide at low costs an electronically beam steerable antenna device which allows for electronic beam steering in a continuous angle sector while increasing radiation efficiency and reducing signal losses.

DISCLOSURE OF INVENTION

The object of the present invention is to provide at low costs an electronically beam steerable antenna device which allows for electronic beam steering in a continuous angle sector while increasing radiation efficiency and reducing signal losses. One more object of the present invention is to provide connection to the millimeter-wave waveguide transceivers.

The objects set above and other objects are attained by providing an electronically beam-steerable antenna device that comprises a dielectric lens having at least one flat surface, a high frequency dielectric board, a plurality of at least one primary antenna element with at least one transmission line formed on the high frequency dielectric board, and a switching network electrically connected to the said plurality of at least one primary antenna element and transmission line and adapted to apply electric power to at least one primary antenna element. The switching network is a semiconductor integrated circuit mounted in or on the high frequency dielectric board, and the high frequency dielectric board with antenna elements and transmission lines formed thereon is adjacent to the flat surface of the dielectric lens.

Advantageously, according to the invention, the objects set above are attained by using a high frequency dielectric board on which the plurality of primary antenna elements and transmission lines are formed and to which the switching network is electrically connected. Research conducted by the inventors of the invention has shown that it was particularly a combination of a high frequency dielectric board with switching network implemented as semiconductor integrated circuit that provided a device with significantly smaller power dissipation and high radiation efficiency of maintaining the desired radiation pattern as well as decrease of signal losses comparing with the integrated lens antenna described in the prior art and shown in FIG. 1 in which a semiconductor die is used as a substrate for implementation of primary antenna elements. It shall be noted that the main difference here between the semiconductor die (in the closest prior art) and the dielectric board (in the disclosed application) is that the former allows realizing the active circuits together with the antenna elements. It requires in principle a semiconductor bulk involving losses and radiation efficiency degradation in the antenna elements. The dielectric board does not allow realizing the active circuits but has significantly lower losses. In the latter case, switching circuit is formed on a separate semiconductor integrated circuit which is electrically connected to the plurality of primary antenna elements and is mounted on the high frequency dielectric board. Thus, though in general antenna structures comprising dielectric lens and plurality of primary antenna elements are known in the prior art; however it was not possible by now to combine in compact structure an antenna elements supporting board, a switching network and antenna elements due to negative influence on each other. In contrast the present invention provides the novel configuration of the antenna device as defined in the claims to achieve low power dissipation and high efficiency of maintaining the desired radiation pattern.

The antenna device according to the described embodiments is a low cost antenna device since the array with an arbitrary size can be easily formed on a dielectric board and a switching network formed on a semiconductor die can be mounted on this board.

The electronically beam steerable antenna device can further comprise a transceiver formed on a semiconductor integrated circuit and electrically connected to the switching network, wherein the transceiver is mounted on the high frequency dielectric board.

According to another embodiment, the plurality of at least one antenna element is formed in between the high frequency dielectric board and the dielectric lens, wherein the transceiver, the switching network, and at least one transmission line are positioned on the side of dielectric board facing the dielectric lens.

According to another embodiment, the plurality of at least one antenna element is formed in between the high frequency dielectric board and the dielectric lens, wherein the transceiver, the switching network, and at least one transmission line are positioned on the side of dielectric board opposite to its side facing the dielectric lens.

According to another embodiment, the transceiver and the switching network are formed on semiconductor integrated circuits which are electrically connected to each other and to the high frequency dielectric board by means of wire bond connections. The switching network can comprise at least one 1×N switch formed on the semiconductor integrated circuits, wherein N≥2. Additionally, each switch can be formed on a separate semiconductor integrated circuit.

According to another embodiment, the transceiver and the switching network are installed into blind cavities made in the high frequency dielectric board. It allows shrinking the length of the wire bond connections and decreasing the interconnection losses.

According to still another embodiment, the transceiver and the switching network are formed on semiconductor integrated circuits which are electrically connected to each other and to the high frequency dielectric board by means of a flip-chip technology.

The high frequency dielectric board can be made of high temperature co-fired ceramics or low temperature co-fired ceramics. According to yet another embodiment, the high frequency dielectric board comprises a printed circuit board. One of the important requirements in integrated lens antennas is the necessity of relatively small difference in the dielectric permittivity values of the antenna array substrate and the lens material that is needed for elimination of surface waves in the substrate. In the disclosed antenna device, different planar technologies can be used for a wide group of lens materials, for instance, PTFE printed circuit boards can be used for lenses made of polytetrafluoroethylene, rexolite, and fused quartz, or low- or high-temperature co-fired ceramics boards can be used for high resistive silicon lenses. This is attained by the separation of semiconductor switching network and the antenna elements realized on a dielectric board. This effect expands the group of the lens materials that can be effectively used in integrated lens antennas comparing with the prior art.

According to yet another embodiment, the switching network is formed on semiconductor integrated circuits and the transceiver is formed by means of waveguide elements and is electrically connected to the high frequency dielectric board by means of a waveguide to microstrip transition. There are many different types of waveguide to microstrip transitions realized using high frequency dielectric boards in the prior art. Ability to connect the antenna device to the millimeter-wave waveguide transceiver is one more advantage of the present invention comparing with the prior art integrated lens antenna.

According to yet another embodiment, the present antenna device additionally comprises another switching network and the plurality of primary antenna elements comprises two arrays of primary antenna elements, wherein the first array is adapted to transmit a signal having a first linear polarization, the second array is adapted to receive a signal having a second linear polarization, orthogonal to the first linear polarization, and each switching network is adapted to independently control one of the two arrays of primary antenna elements. In this embodiment, the antenna device provides transmit and receive polarization diversity using one frequency band and one beam direction.

According to yet another embodiment, the present antenna device further comprises another switching network, each primary antenna element is adapted to transmit a signal having a first linear polarization and to receive a signal having a second linear polarization, orthogonal to the first linear polarization, and each switching network is adapted to independently control the plurality of primary antenna elements while transmitting a signal having the first linear polarization and receiving a signal having the second linear polarization, respectively. In this case, microstrip dual polarization antenna elements can be used as the primary antenna elements.

According to yet another embodiment, the primary antenna elements are microstrip antenna elements.

The dielectric lens in the antenna device according to the present invention forms a narrow beam and provides a beam deviation while scanning. The plurality of primary antenna elements and transmission lines are integrated on a flat surface of the dielectric lens. According to one embodiment the dielectric lens shape can be selected from the group comprising hemiellipsoidal shape with a cylindrical extension, hemispherical shape with a cylindrical extension, hemiellipsoidal shape with a truncated cone extension, and a shape of an ellipsoid truncated with a plane extending perpendicularly to an axis of the ellipsoid in proximity of a focus of the ellipsoid. From the prior art it is known that the length of the cylindrical extension is usually chosen to be close to the optical focus of the lens.

According to yet another embodiment, the presented antenna device is adapted to provide high data rate point-to-point millimeter-wave wireless communications for a radio relay station and to adjust a beam in case of initial adjustment or slight changes of orientation of a radio relay station due to such external effects as wind, vibrations, compression and/or extension of portions of the supporting structure with the temperature changes etc.

Also provided is a method of high data rate point-to-point millimeter-wave communications, including the steps of: providing an electronically beam steerable antenna device according to the described embodiments; applying electric power to the at least one primary antenna element of the antenna device to form a radiation pattern having a beam deviation in a specific direction; switching the at least one primary antenna elements by the switching network when it necessary to adjust the beam direction in response to a change in orientation of a radio relay station comprising the antenna device; and receiving and/or transmitting signals by the antenna device.

BRIEF DESCRIPTION OF DRAWINGS

The present invention will be described in further details with references being made to the accompanying drawings, wherein:

FIG. 2a corresponds to an embodiment wherein the dielectric board is provided with blind cavities, FIGS. 2b and 2c correspond to an embodiment wherein a flip-chip mounting technology is used, wherein in FIG. 2c semiconductor integrated circuits are arranged on the side of the dielectric lens;

FIGS. 4 (A and B) illustrates an embodiment with separate receiving and transmitting functions, wherein FIG. 4a depicts an example configuration including two independent arrays of primary antenna elements, and FIG. 4b depicts an example configuration including one array of primary antenna elements with two independent inputs each;

DETAILED DESCRIPTION OF EMBODIMENTS

The present invention will be more fully understood from the description of the embodiments of realization of an electronically beam steerable integrated lens antenna for high data rate point-to-point millimeter-wave communications in radio relay station applications.

Figure 2:
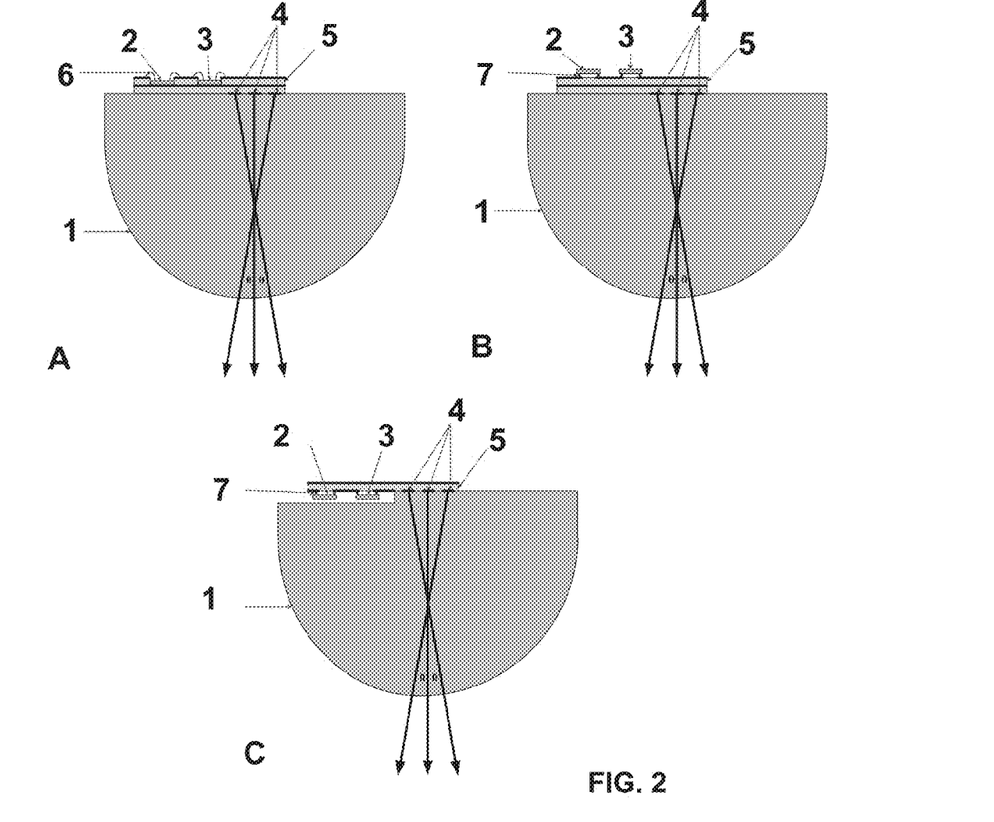
FIG. 2 (A, B, C) shows example axial sections of embodiments of the present integrated lens antenna device according to various relative arrangements of a transceiver and a switching network.

FIG. 2 shows axial sections of various embodiments of an integrated lens antenna according to the present invention.

In one embodiment, the integrated lens antenna comprises a homogeneous dielectric lens 1, primary antenna elements 4 and transmission lines for connecting thereof (not shown), a switching network 3 adapted to apply electric power to at least one primary antenna element, and a transceiver 2. The switching network 3 and the transceiver 2 are implemented as semiconductor integrated circuits. Primary antenna elements 4 are formed on high frequency dielectric board 5 and integrated in or on a flat surface of homogeneous dielectric lens 1. A multilayer printed or ceramic board can be used as a high frequency dielectric board 5. The dielectric board 5 can be made of high temperature co-fired ceramics, low temperature co-fired ceramics or other suitable materials.

FIG. 2 illustrates various relative arrangements of the transceiver 2 and the switching network 3 on the dielectric board 5.

According to an embodiment illustrated in FIG. 2a, the dielectric board 5 has blind cavities for mounting a semiconductor integrated circuit comprising the switching network 3 and the transceiver 2 on its one side, and a plurality of antenna elements 4 formed on its other side facing dielectric lens 1. The switching network 3 and the transceiver 2 are electrically connected to the transmission lines by means of wire bond connections 6. Thus, in this embodiment, antenna elements 4 are formed in between the dielectric board 5 and the dielectric lens 1 disposed adjacent to one other. The dielectric board 5 and the dielectric lens 1 can be connected to each other in different ways, for example the dielectric board 5 can be glued to the dielectric lens 1 or fixed on it using any suitable methods. The dielectric board 5 can be also stacked on the dielectric lens 1 using other appropriate technology.

According to another embodiment illustrated in FIG. 2b, the transceiver 2 and semiconductor integrated circuit with the switching network 3 are electrically connected to the dielectric board 5 by means of flip-chip connections 7. In this embodiment, the dielectric board 5 has no cavities, and the switching network 3 and the transceiver 2 are mounted upon its one side, while a plurality of antenna elements 4 are formed on its other side facing the dielectric lens 1. Thus, antenna elements 4 are formed in between the dielectric board 5 and the dielectric lens 1 which are adjacent to one other.

According to still another embodiment illustrated in FIG. 2c, the transceiver 2 and semiconductor integrated circuit comprising the switching network 3 are electrically connected to the dielectric board 5 by means of flip-chip connections 7, which are positioned on the side of the dielectric board 5 facing the lens 1. According to this embodiment, the dielectric lens 1 has special cut-outs for housing the transceiver 2 and the switching network 3. Such configuration can be used even in case of a one-layer dielectric board 5 made of high temperature co-fired ceramics, for example. In addition, in this embodiment, it is desirable to minimize radiation leakage from the transceiver 2 and the switching network 3 as well as the points of their connections to the dielectric board 5 into the body of the lens 1, for example by metal coating an inner surface of the dielectric lens cut-outs. The dielectric board and the dielectric lens are adjacent to one other.

Figure 3:
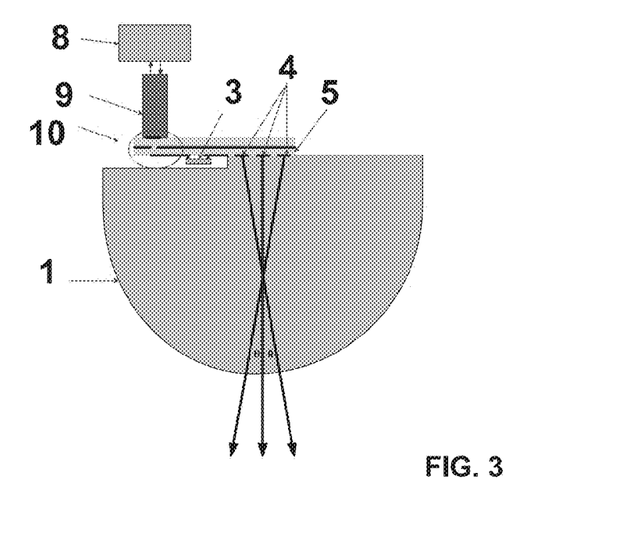
FIG. 3 shows an axial section of the present integrated lens antenna device according to an embodiment wherein the transceiver is formed by means of waveguide elements and electrically connected to the high frequency dielectric board by means of a waveguide to microstrip transition.

In millimeter-wave radio relay stations, a transceiver can be formed by means of waveguide elements in view of yet limited accessibility of efficient technologies for manufacturing semiconductor integrated circuits having characteristics required for a millimeter-wave range. Thus, FIG. 3 shows an axial section of the lens antenna according to another embodiment, wherein a transceiver 8 is formed by means of waveguide elements and electrically connected to the dielectric board 5 by means of a waveguide 9 and a waveguide-to-microstrip transition 10. Antenna elements and transmission lines are formed in between the dielectric board and the flat surface of the dielectric lens, wherein the dielectric board and the dielectric lens are adjacent to one other. Integrated circuit with the switching network 3 is arranged on the dielectric board 5 using flip chip connections on a side of the dielectric board 5 facing the lens 1, similar to one of the configurations illustrated in FIGS. 2b and 2c. According to this embodiment, the dielectric lens 1 has recesses for housing the switching network 3. In the embodiment, it is also desirable to minimize radiation leakage from the switching network 3 into the body of the lens 1, for example by metal coating an inner surface of the recesses in dielectric lens.

Figure 4:
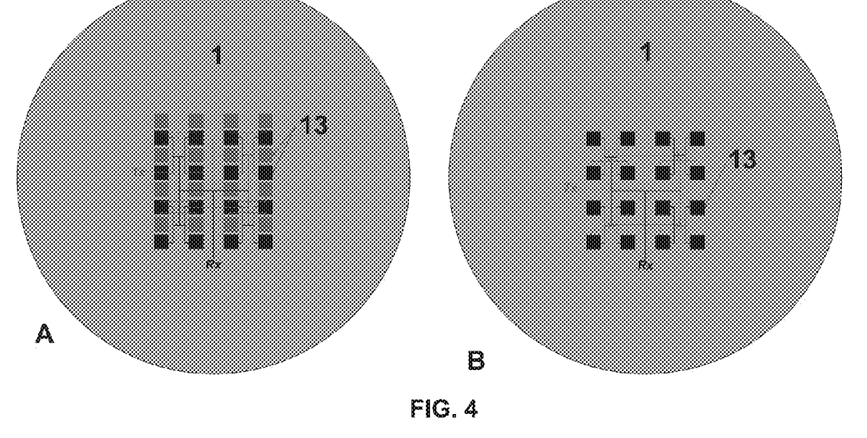

FIG. 4a, 4b illustrate embodiments with separate signal receiving and transmitting functions. According to an embodiment illustrated in FIG. 4a, the present integrated lens antenna comprises two arrays of antenna elements 13 integrated on the lens 1 and another switching network such that the integrated lens antenna comprises two switching networks. One of the arrays is adapted to transmit a signal having a first linear polarization, and another array is adapted to receive a signal having a second linear polarization, orthogonal to the first linear polarization. Each switching network is adapted to independently control one of the arrays of primary antenna elements.

According to another embodiment illustrated in FIG. 4b, the integrated lens antenna similarly comprises another switching network such that the integrated lens antenna comprises two switching networks and one array of antenna elements. Each primary antenna element 13 is adapted to transmit a signal having a first linear polarization and to receive a signal having a second linear polarization, orthogonal to the first linear polarization. Each switching network is adapted to independently control the primary antenna elements while transmitting a signal having the first linear polarization and receiving a signal having the second linear polarization, respectively.

Figure 5:
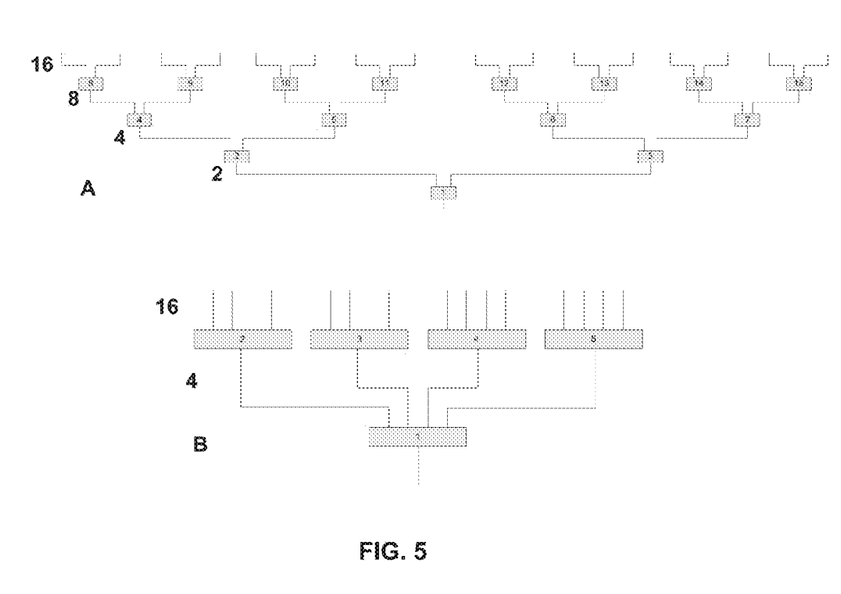
FIGS. 5 (A and B) illustrates examples of switching networks for 16 primary antenna elements, wherein in the embodiments in FIG. 5a switches of 1×2 type are used, and in FIG. 5b switches of 1×4 type are used.

According to one embodiment, the switching network comprises at least one 1×N switch formed on the semiconductor integrated circuits, wherein FIG. 5 illustrates example switching networks for 16 primary antenna elements, wherein FIG. 5a illustrates a case of using switches of 1×2 type, and FIG. 5b illustrates a case of using switches of 1×4 type. Each switch can be formed on a separate semiconductor integrated circuit.

Figure 6:
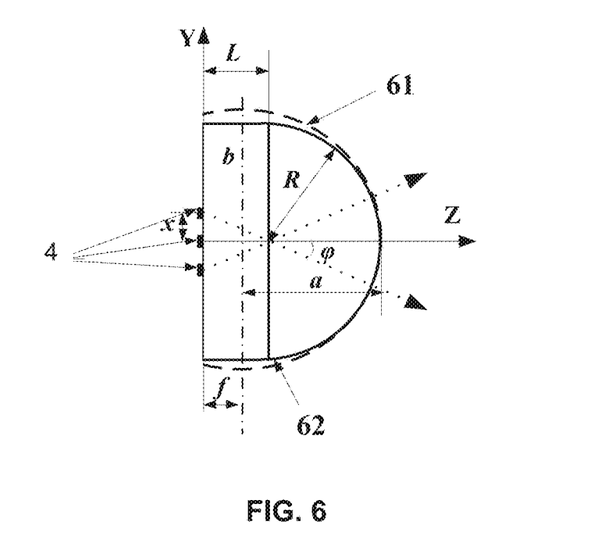
FIG. 6 illustrates hemiellipsoidal and hemispherical shapes of a dielectric lens having a cylindrical extension.

FIG. 6 illustrates hemiellipsoidal and hemispherical shapes of dielectric lens 1 having a cylindrical extension. The length of the cylindrical extension can be set on the basis of the analysis of final characteristics of the antenna according to the present invention with a particular primary antenna element. The main requirement for the material of the dielectric lens according to the present invention is ability to provide a low level of dielectric losses.

Figure 7:
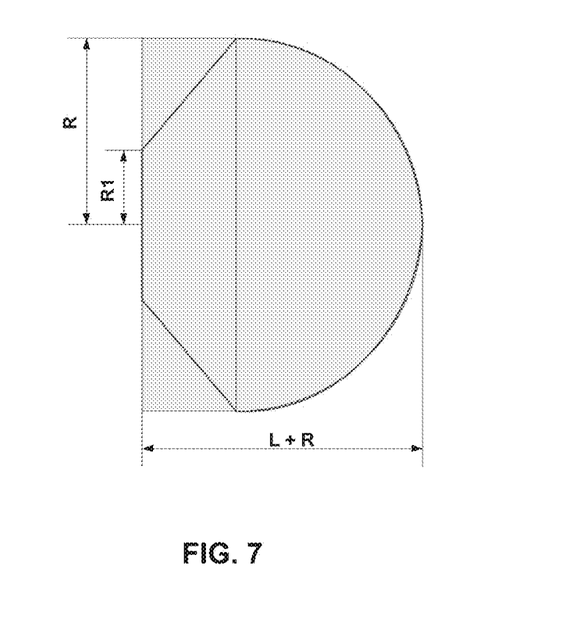
FIG. 7 illustrates a hemispherical shape of a dielectric lens having a truncated cone extension used in the present lens antenna.

According to another embodiment, the lens weight is reduced by truncating a lens portion which does not positively contribute to the directivity of the lens antenna. FIG. 7 illustrates a corresponding hemispherical shape of the dielectric lens having a truncated cone extension. The weight reduction is important for large antennas used in radio relay stations.

Figure 8:
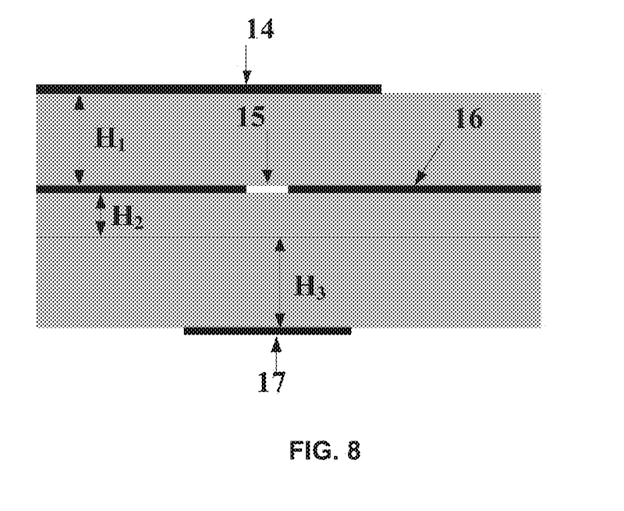
FIG. 8 illustrates an embodiment with microstrip antenna configuration used as a primary antenna element.

FIG. 8 illustrates a microstrip antenna configuration used as a primary antenna element in the lens antenna according to the present invention. According to the illustrated configuration, the electromagnetic coupling occurs through the slot aperture in the ground plane.

Figure 9:
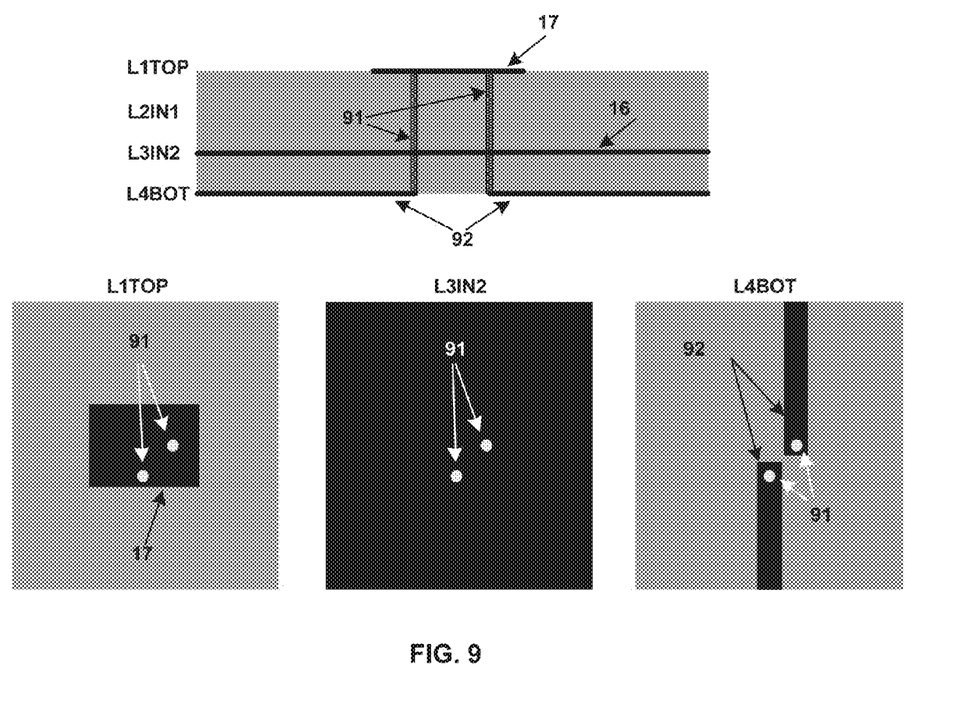
FIG. 9 illustrates an embodiment with dual-polarized microstrip antenna configuration used as a primary antenna element.

According to yet another embodiment illustrated in FIG. 9, a dual polarization microstrip antenna element is used as a primary antenna element. The dual polarization is achieved by means of two feed points through via holes 91 for direct signal inputting.

Various dipoles, slot antennas etc. may be also used as planar primary antenna elements for integrated lens antennas. However, in case of small dielectric permittivity antenna elements having the major portion of the radiation concentrated in one half-space, i.e. half-space on the side of the lens, are preferable. Particularly, such antenna elements include the above described microstrip antenna elements having different techniques for signal inputting, wherein the presence of a large ground plane ensures a radiation pattern concentrated in the half-space on the side of the lens.

As it is shown in FIG. 2, for example, when electric power is applied to one of primary antenna elements 4 each displaced with respect to the central axis of lens 1 a radiation pattern having a beam deviation in a specific direction is formed. In case of initial adjustment or slight orientation changes of a radio relay station due to such external effects as wind, vibrations, compression and/or extension of portions of the supporting structure, the narrow beam direction can be corrected by switching primary antenna elements 4 with the help of switching network 3. Primary antenna elements 4 having a small size can be configured so as to provide beam overlapping at an acceptable level, e.g. the level corresponding to a half radiation pattern beamwidth, while electronic beam steering.

Thus, the low cost integrated lens antenna according to the present invention allows for electronic beam steering in a continuous angle sector while increasing radiation efficiency and reducing signal losses.

The present invention is not limited to specific embodiments described in the present disclosure by way of example only; the invention encompasses all modifications and variations without departing from the scope of the invention set forth in the accompanying claims.

The invention claimed is:

1. An electronically beam-steerable antenna device comprising
a dielectric lens having at least one flat surface,
a high frequency dielectric board,
a plurality of at least one primary antenna element with at least one transmission line formed on the high frequency dielectric board, and
a switching network electrically connected to the said plurality of at least one primary antenna element and at least one transmission line and adapted to apply electric power to the at least one primary antenna element,
wherein the switching network is a semiconductor integrated circuit mounted in or on the high frequency dielectric board, and
the high frequency dielectric board with the plurality of at least one antenna element and at least one transmission line formed thereon is adjacent to the flat surface of the dielectric lens,
wherein the antenna device further comprises a transceiver formed on a semiconductor integrated circuit and electrically connected to the switching network, wherein the transceiver is mounted on the high frequency dielectric board, and
wherein the plurality of at least one antenna element is formed in between the high frequency dielectric board and the dielectric lens, wherein the transceiver, the switching network, and at least one transmission line are positioned on the side of dielectric board opposite to the dielectric lens.

2. The antenna device according to claim 1, wherein the transceiver and the switching network are electrically connected to each other and to the plurality of primary antenna elements by means of wire bond connections.

3. The antenna device according to claim 2, wherein the transceiver and the switching network are mounted into blind cavities formed in the high frequency dielectric board.

4. The antenna device according to claim 1, wherein the transceiver and the switching network are electrically connected to each other and to the plurality of primary antenna elements by means of flip-chip connections.

5. The antenna device according to claim 1, wherein the high frequency dielectric board is made of high temperature co-fired ceramics or low temperature co-fired ceramics.

6. The antenna device according to claim 1, wherein the high frequency dielectric board comprises a printed circuit board.

7. The antenna device according to claim 1, further comprising a transceiver formed by means of waveguide elements and electrically connected by means of a waveguide-to-microstrip transition to the switching network mounted on the high frequency dielectric board.

8. The antenna device according to claim 2, wherein the switching network comprises at least one 1×N switch formed on a semiconductor integrated circuit, wherein N>2.

9. The antenna device according to claim 4, wherein the switching network comprises at least one 1×N switch formed on a semiconductor integrated circuit, wherein N>2.

10. The antenna device according to claim 8, wherein at least one 1×N switch is formed on a separate semiconductor integrated circuit.

11. The antenna device according to claim 1, wherein said antenna device further comprises
another switching network, and
the plurality of primary antenna elements comprises two arrays of primary antenna elements,
the first array being adapted to transmit a signal having a first linear polarization, the second array being adapted to receive a signal having a second linear polarization, orthogonal to the first linear polarization, and each switching network being adapted to independently control one of the two arrays of primary antenna elements.

12. The antenna device according to claim 1, wherein said antenna device additionally comprises another switching network and each primary antenna element is adapted to transmit a signal having a first linear polarization and to receive a signal having a second linear polarization, orthogonal to the first linear polarization, each switching network being adapted to independently control the plurality of primary antenna elements while transmitting a signal having the first linear polarization and receiving a signal having the second linear polarization, respectively.

13. The antenna device according to claim 12, wherein the primary antenna elements are at least one of microstrip dual polarization antenna elements, dipoles antenna elements and slot antenna elements.

14. The antenna device according to claim 1, wherein a dielectric lens shape is selected from the group comprising hemiellipsoidal shape with a cylindrical extension, hemispherical shape with a cylindrical extension, hemiellipsoidal shape with a truncated cone extension, and a shape of an ellipsoid truncated with a plane extending perpendicularly to an axis of the ellipsoid in proximity to a focus of the ellipsoid.

15. The antenna device according to claim 1, wherein the primary antenna elements are microstrip antenna elements.

16. The antenna device according to claim 1, wherein said antenna device is adapted to provide high data rate point-to-point millimeter-wave communications and to adjust a beam in case of initial adjustment or slight orientation changes of the antenna device due to such external effects as wind, vibrations, compression and/or extension of portions of the supporting structure with the temperature changes etc.

17. A high data rate point-to-point millimeter-wave communications system comprising an antenna device according to claim 1.

18. A method of high data rate point-to-point millimeter-wave communications, including the steps of:

providing an electronically beam-steerable antenna device comprising a plurality of primary antenna elements and transmission lines, according to claim 1;

applying electric power to the at least one primary antenna element of the antenna device to form a radiation pattern having a beam deviation in a specific direction;

switching the at least one primary antenna elements by the switching network when it necessary to adjust the beam direction in response to a change in orientation of a radio relay station comprising the antenna device; and receiving and/or transmitting signals by the antenna device.

* * * * *